J. O. GLANVILLE.
SALVAGE WAGON.
APPLICATION FILED APR. 4, 1908.

908,660.

Patented Jan. 5, 1909.

2 SHEETS—SHEET 1.

Witnesses:
G. A. Pennington
J. B. Megown

Inventor:
John O. Glanville,
By
Attys.

J. O. GLANVILLE.
SALVAGE WAGON.
APPLICATION FILED APR. 4, 1908.
908,660.
Patented Jan. 5, 1909.
2 SHEETS—SHEET 2.
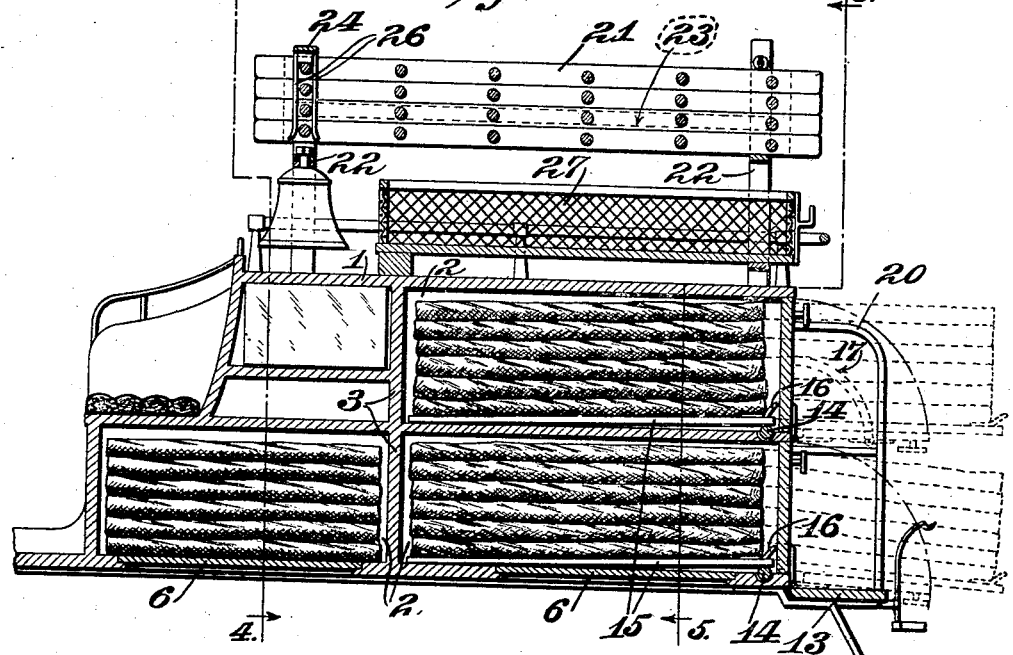
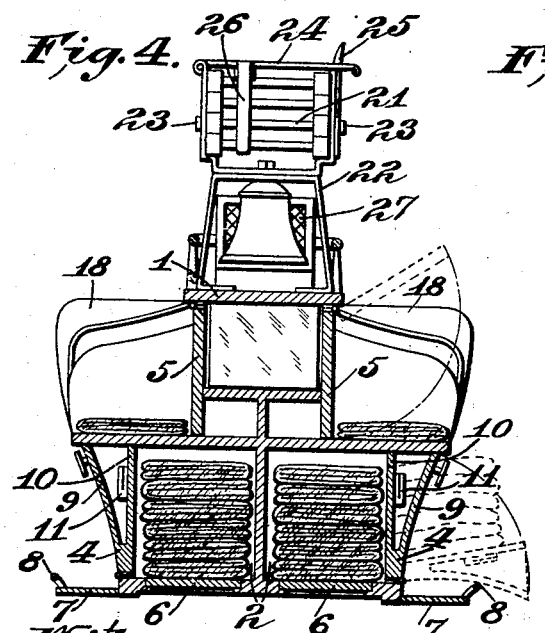
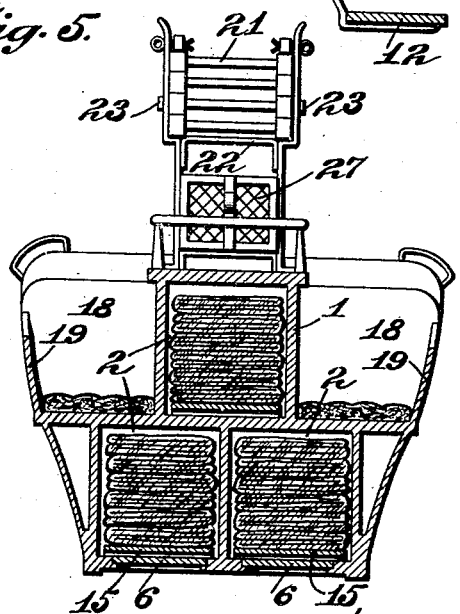
Witnesses:
G. A. Pennington
J. B. McGown
Inventor:
John O. Glanville
By Cannt Cain
Attys.

UNITED STATES PATENT OFFICE.

JOHN O. GLANVILLE, OF ST. LOUIS, MISSOURI, ASSIGNOR OF ONE-HALF TO WALLACE C. CAPEN, OF ST. LOUIS, MISSOURI.

SALVAGE-WAGON.

No. 908,660.   Specification of Letters Patent.   Patented Jan. 5, 1909.

Application filed April 4, 1908. Serial No. 425,148.

*To all whom it may concern:*

Be it known that I, JOHN O. GLANVILLE, a citizen of the United States, and a resident of the city of St. Louis and State of Missouri, have invented a new and useful Improvement in Salvage-Wagons, of which the following is a specification.

My invention relates to salvage wagons and has for its principal objects to arrange the storage compartments so that the members of the crew may have access to the several compartments without waiting for or interfering with one another; to arrange the seating space so that the members of the crew can mount and dismount rapidly and without interfering with one another; and to secure other advantages hereinafter appearing.

Figure 1:
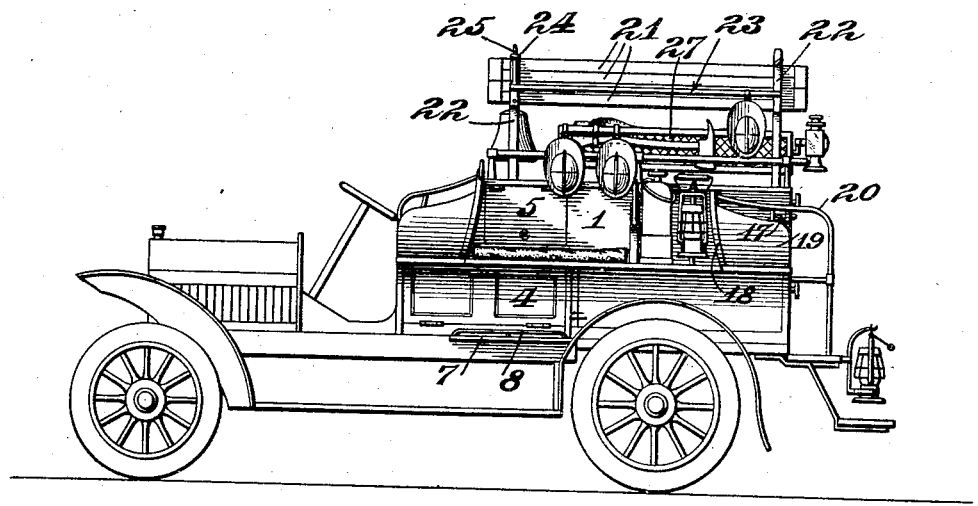
Figure 2:
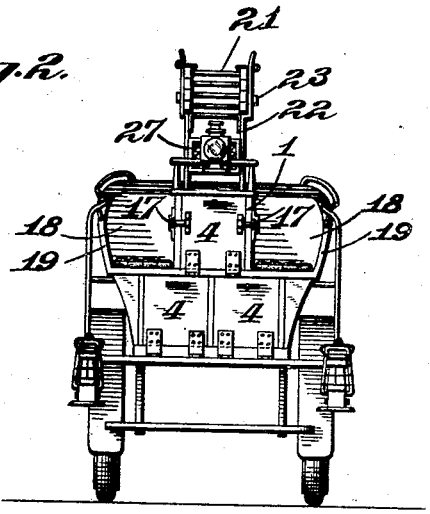

In the accompanying drawing, which forms part of this specification, and wherein like symbols refer to like parts wherever they occur, Figure 1 is a side elevation of a salvage wagon embodying my invention; Fig. 2 is an end elevation thereof; Fig. 3 is a longitudinal section thereof with the running gear removed; and, Figs. 4 and 5 are vertical cross sections thereof on the lines 4—4 and 5—5 of Fig. 3, respectively.

Mounted on a suitable running gear is a closed wagon body which has an upwardly extending portion 1 arranged longitudinally in the middle thereof. Preferably, the upwardly extending portion is partitioned from the lower portion of the wagon body, and the lower portion is itself divided by a vertical longitudinal partition into two or more compartments 2, all of which have openings at the rear end of the body. Preferably, also, both the upper and the lower compartments are divided by transverse partitions 3, the forward compartments thus formed being open at the side. The several openings are closed by means of doors 4, 5, the rear doors and the lower side doors being preferably hinged at the bottom of the openings, and the doors for the upper side openings being preferably hinged at the top of the openings. The bottoms of the lower compartments also preferably have large openings therein through which access may be had to the running gear or parts below the body. These openings are normally closed by means of trap doors or removable bottoms 6. The transverse partitions 3 are so located that the doors for the forward compartments formed thereby will swing clear of the rear wheels of the vehicle. The sides of the vehicle below said doors are provided with steps 7 which are preferably provided with foot rests or rails 8 along the outer margins thereof.

The steps are so located as to constitute supporting shelves for the doors in their open or lowermost position. Preferably, the sides of the vehicle are curved outwardly, and the doors for the side compartments have an outer wall 9 conforming to the curvature of the side and also a straight wall 10 the two walls together forming a V-shaped pocket. This pocket serves for the accommodation of special tools; as, for instance, slotted members 11 adapted to constitute a rest for a saw may be mounted on the wall thereof. At the rear end of the body are provided steps 12, 13, the upper one being in position to act as a support for the doors of the lower compartments in their lowermost position. Each of the rear compartments has a roller 14 or other anti-friction device located close to the rear end thereof and on this anti-friction roller rests the rear end of a shelf 15 or removable bottom that is provided with a handle 16 by which it may easily be pulled out in position to rest upon the downturned door of the compartment. In the case of the door of the upper rear compartment, it is supported in its lowermost position by means of links 17 connected to the inner side thereof and arranged to coöperate with a suitable member provided therefor upon the body.

In order to provide seating space for the crew, the top of the body at the sides and front end of the upwardly extending portion of said body is formed into seats, all of which face outwardly and all of which are immediately accessible from the ground, so that each member of the crew can reach his appropriate seat without having to pass any other seat. For this purpose, the space at each rear corner is converted into a rearwardly facing seat by means of a transverse partition or division plate 18 constituting a back therefor and by means of a longitudinal marginal supporting member 19. The space at the sides forward of said division plate furnishes seats for two members of the crew. Adjacent to each seat is one or more hand-holds 20 conveniently located for the member of the crew in said seat.

The space above the upwardly extending portion of the body is utilized for the accommodation of the ladders 21 and miscellaneous tools. For this purpose, two frames 22 are mounted on the front and rear parts of said member. These frames are connected by means of rods 23 or rails which constitute supports or hangers for hats and implements. The upper portion of each frame is bifurcated and has a horizontal member adapted to constitute a support for ladders. Hinged to the upper portion of one fork or member of one of the frames is a member 24 which is adapted to engage and interlock with a portion of the opposite fork. For instance, as illustrated in the drawing, this pivotal member interlocks with a spring latch 25 provided therefor on the frame. The pivotal member has a U-shaped or bifurcated member 26 mounted on the lower side thereof and arranged to straddle the rungs of a tier of ladders mounted on said support, and thereby hold them in position. Also mounted on the middle member of the body and below the ladders is a wire basket 27 adapted to receive miscellaneous implements such as squilgees and the like.

In practice, all of the rear compartments and the lower front compartments of the wagon body are used to hold tarpaulins. Tarpaulins are also carried on the side and rear end seats, serving as cushions for said seats, whose dimensions are computed with reference to the folding of the tarpaulins. The ladders are carried in the middle of the vehicle where they are conveniently accessible. The tools, implements and other portions of the equipment are carried in the basket or on the supporting rails or in the V-shaped pockets or in the upper front compartments, or on the side margins of the body on the parts between the side and rear seats. In case the wagon is a motor driven vehicle, the upper front compartments are preferably divided by one or more horizontal partitions, the upper compartment being conveniently located for accommodating the gasolene tank and the other compartments being available for the storage of tools and implements.

Obviously, my wagon admits of considerable modification without departing from my invention, and therefore I do not wish to be restricted to the specific construction shown and described.

What I claim is:

1. A wagon comprising a closed body having openings in its sides and ends accessible from the ground, and doors for the respective openings, outwardly facing seats along the sides and ends of said body, and steps for the respective seats located below said openings.

2. A wagon comprising a closed body divided into compartments each having an opening in a vertical wall thereof accessible from the ground, doors hinged at the bottoms of said openings, and outwardly facing seats on said compartments along the side and end portions of said body.

3. A wagon comprising a closed body having outwardly facing seats on its side and end portions and having an upwardly extending closed portion constituting a storage compartment arranged longitudinally in the middle thereof, the rear end of said storage compartment having an opening accessible from the ground, and a door for said opening.

4. A wagon comprising a closed body having outwardly facing seats on its side and end portions and having a closed upwardly extending portion constituting a storage compartment arranged longitudinally of the middle thereof, and a ladder rack above said compartment, said compartment having an opening in its rear end accessible from the ground and a door for said opening.

5. A wagon comprising a closed body having outwardly facing seats on its side and end portions and having a closed upwardly extending portion constituting a storage compartment arranged longitudinally in the middle thereof, and a tool basket above said compartment, said compartment having an opening in its rear end accessible from the ground and a door for said opening.

6. A wagon comprising a closed body having outwardly facing seats on its side and end portions and having a closed upwardly extending portion constituting a storage compartment arranged longitudinally in the middle thereof, a tool basket above said compartment, and a ladder rack above said basket, said compartment having an opening in its rear end accessible from the ground and a door for said opening.

7. A wagon comprising a closed body having outwardly facing seats on its side and end portions and having a closed upwardly extending portion constituting a storage compartment arranged longitudinally of the middle thereof, frames mounted on said upwardly extending portion and constituting a ladder rack, and horizontal rails connecting said frames, said compartment having an opening in its rear end accessible from the ground and a door for said opening.

8. A wagon comprising a closed body having outwardly facing seats along its sides and end and steps below said seats, said body having openings in its sides and end and doors hinged below the respective openings, the steps constituting supports for the doors.

9. A salvage wagon comprising a closed body having openings in its sides accessible from the ground and doors for the respective openings hinged below the same, said doors having V-shaped pockets therein adapted to receive tools.

In witness whereof I have signed my name to this specification in the presence of two subscribing witnesses this 2nd day of April, 1908, at St. Louis, Missouri.

JOHN O. GLANVILLE.

Witnesses:
WALLACE C. CAPEN,
J. B. MEGOWN.